(12) United States Patent
Eckelberg

(10) Patent No.: US 7,618,061 B2
(45) Date of Patent: Nov. 17, 2009

(54) AIR BAG MODULE WITH RELEASABLE TETHER

(75) Inventor: Eric J. Eckelberg, Macomb, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 555 days.

(21) Appl. No.: 11/410,554

(22) Filed: Apr. 25, 2006

(65) Prior Publication Data

US 2007/0246924 A1   Oct. 25, 2007

(51) Int. Cl.
B60R 21/16 (2006.01)
(52) U.S. Cl. .................... 280/743.2; 280/743.1
(58) Field of Classification Search ............... 280/743.2, 280/743.1
See application file for complete search history.

(56) References Cited

U.S. PATENT DOCUMENTS

| | | | |
|---|---|---|---|
| 5,762,367 A | 6/1998 | Wolanin | |
| 5,887,894 A | 3/1999 | Castagner et al. | |
| 6,076,854 A | 6/2000 | Schenck et al. | |
| 6,334,627 B1 | 1/2002 | Heym et al. | |
| 6,454,300 B1 | 9/2002 | Dunkle et al. | |
| 6,561,545 B2 | 5/2003 | Greib et al. | |
| 6,581,964 B2 | 6/2003 | Braunschadel | |
| 6,616,184 B2 | 9/2003 | Fischer | |
| 6,749,217 B2 | 6/2004 | Damian et al. | |
| 6,808,205 B2 | 10/2004 | Hawthorn et al. | |
| 6,857,659 B2 | 2/2005 | Webber | |
| 6,869,103 B2 | 3/2005 | Ryan et al. | |
| 6,918,614 B2 | 7/2005 | Ryan | |
| 6,932,384 B2 | 8/2005 | Waid et al. | |
| 7,261,320 B2 * | 8/2007 | Fredin et al. | 280/743.2 |
| 7,377,548 B2 * | 5/2008 | Bauer et al. | 280/743.2 |
| 2002/0030355 A1 | 3/2002 | Braunschaded | |
| 2002/0096871 A1 | 7/2002 | Pinsenschaum | |
| 2002/0117840 A1 | 8/2002 | Dunkle et al. | |
| 2002/0175511 A1 | 11/2002 | Dunkle et al. | |
| 2004/0051285 A1 | 3/2004 | Fischer | |
| 2006/0237956 A1 | 10/2006 | Fellhauer et al. | |

FOREIGN PATENT DOCUMENTS

JP   533427   5/1993

* cited by examiner

*Primary Examiner*—Eric Culbreth
(74) *Attorney, Agent, or Firm*—Tarolli, Sundheim, Covell & Tummino LLP

(57) ABSTRACT

An apparatus (10) for helping to protect an occupant (14) of a vehicle (12) includes a housing (26) and an air bag (22) supported by the housing. An inflator (24) is supported by the housing (26). The inflator (24) includes a first stage (40) including at least one first outlet passage (44) and a second stage (50) including at least one second outlet passage (54). The first and second outlet passages (44 and 54) are provided for discharging inflation fluid into the air bag (22). An anchor (110) is secured to the inflator (24) and at least partially blocks inflation fluid flow through the second outlet passage (54). The anchor (110) is configured to disconnect from the inflator (24) in response to inflation fluid discharged through the second outlet passage (54) when the second stage (50) is actuated. At least one tether (100) has a first end (102) connected to the air bag (22) and a second end (106) secured to the anchor (110).

11 Claims, 5 Drawing Sheets

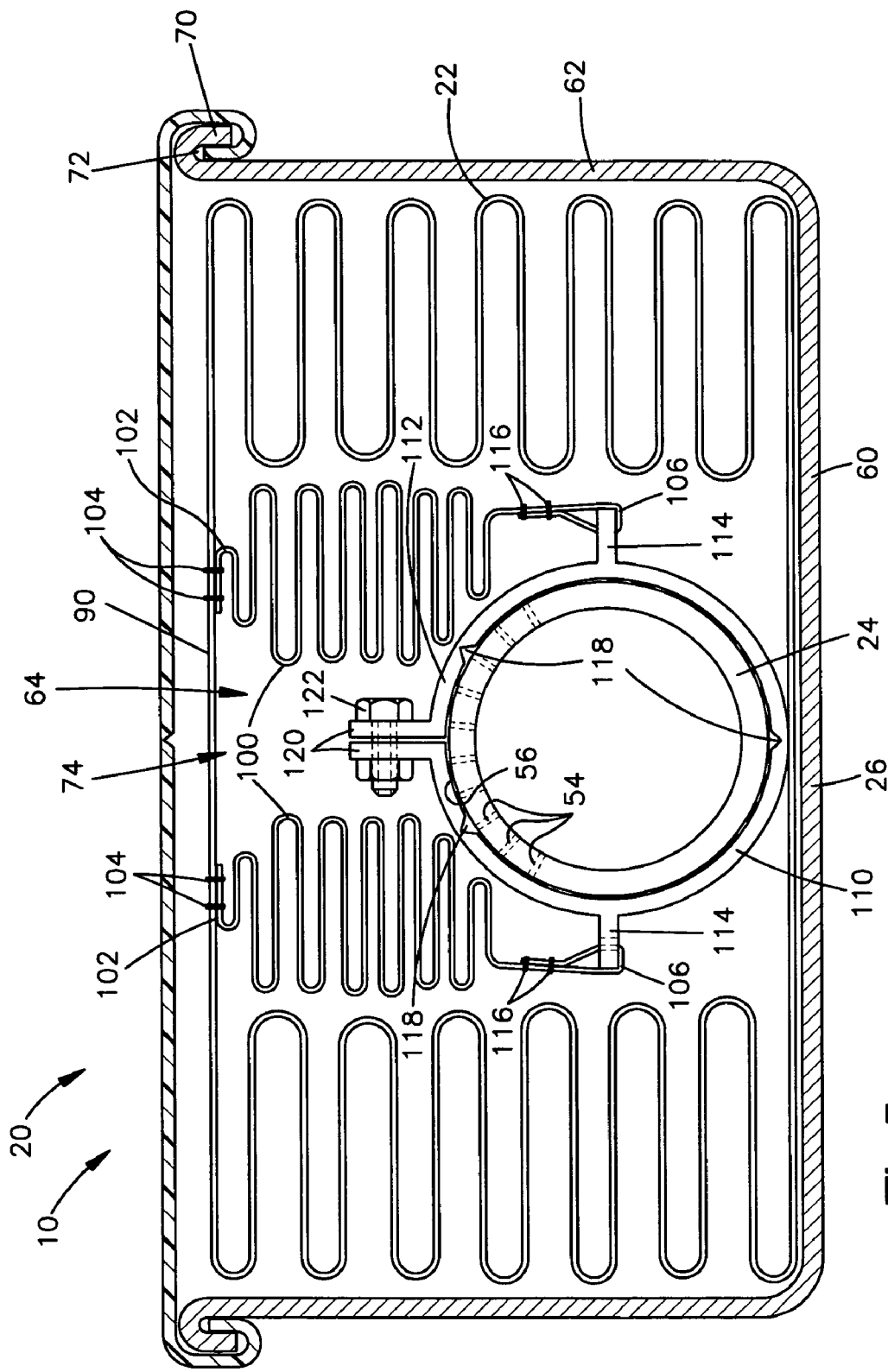

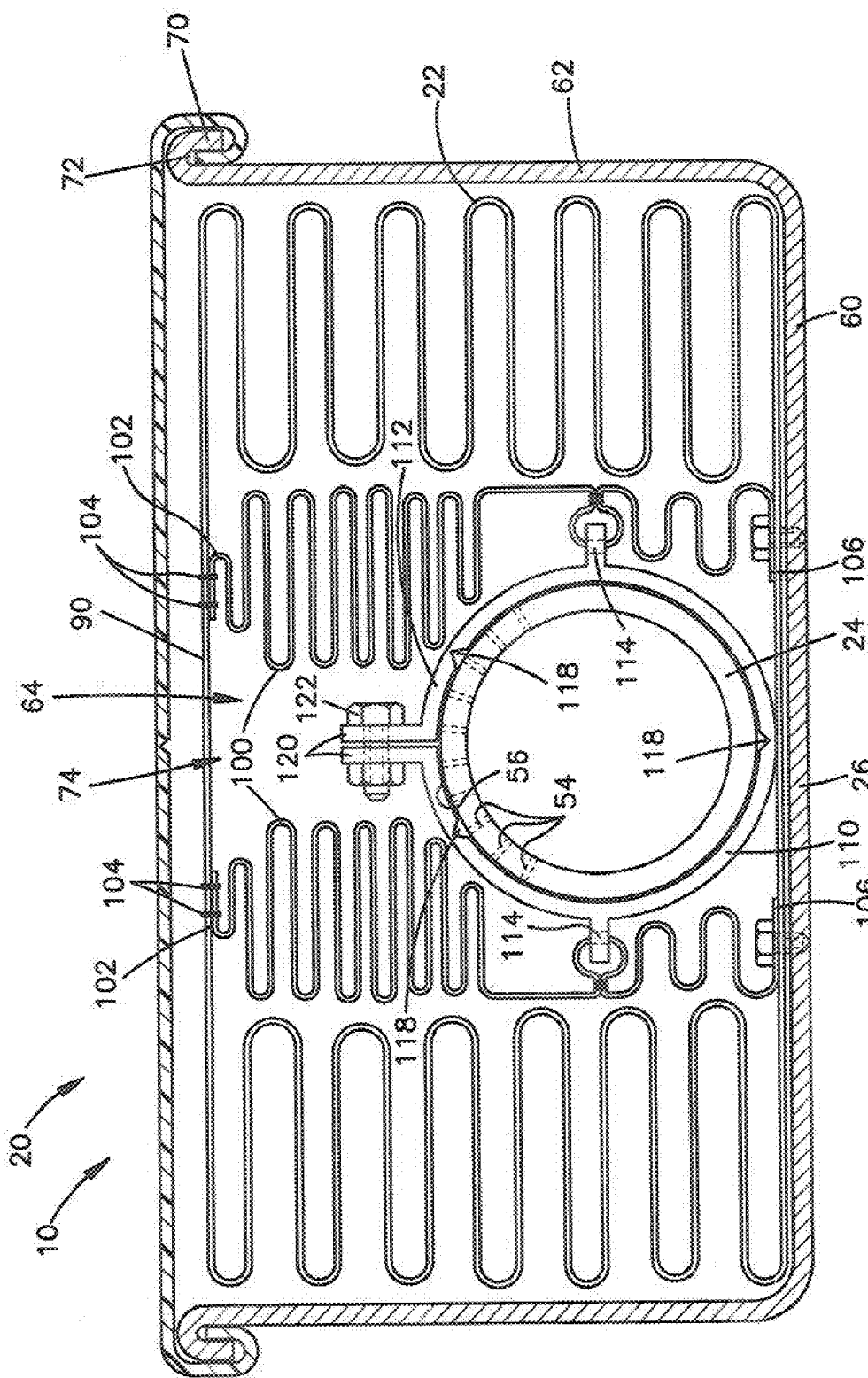

AIR BAG MODULE WITH RELEASABLE TETHER

TECHNICAL FIELD

The present invention relates to an apparatus for helping to protect an occupant of a vehicle. More specifically, the present invention relates to an air bag module including a tether for helping to control the inflated shape or depth of the air bag. The tether is releasable to alter the inflated configuration of the air bag.

BACKGROUND OF THE INVENTION

It is known to provide an air bag module with an air bag and one or more tethers that help control the inflated configuration of the air bag. It is also known to provide a tether having an effective length that can be selectively adjusted to help control the inflated configuration of the air bag in response to sensed vehicle or occupant conditions. For example, a solenoid may be actuatable to release a tether in response to a sensed condition indicative of a position of a vehicle seat or a position of an occupant of the seat associated with the air bag module.

SUMMARY OF THE INVENTION

The present invention relates to an apparatus for helping to protect an occupant of a vehicle. The apparatus includes a housing and an air bag supported by the housing. An inflator is supported by the housing. The inflator includes a first stage including at least one first outlet passage and a second stage including at least one second outlet passage. The first and second outlet passages are provided for discharging inflation fluid into the air bag. An anchor is secured to the inflator and at least partially blocks inflation fluid flow through the second outlet passage. The anchor is configured to disconnect from the inflator in response to inflation fluid discharged through the second outlet passage when the second stage is actuated. At least one tether has a first end connected to the air bag and a second end secured to the anchor.

The present invention also relates to an apparatus for helping to protect an occupant of a vehicle. The apparatus includes a housing and an air bag supported by the housing. An inflator is supported by the housing. The inflator includes a first stage including at least one first outlet passage and a second stage including at least one second outlet passage. The first and second outlet passages are provided for discharging inflation fluid into the air bag. An anchor is secured to the inflator and at least partially blocks inflation fluid flow through the second outlet passage. The anchor is configured to undergo a structural failure in response to inflation fluid discharged through the second outlet passage when the second stage is actuated. At least one tether has a first end connected to the air bag and a second end secured to the anchor.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 5 is a sectional view of the apparatus;

FIG. 6 is a schematic view, partially in section, of the apparatus in accordance with another embodiment of the present invention.

DETAILED DESCRIPTION OF THE INVENTION

Figure 1:
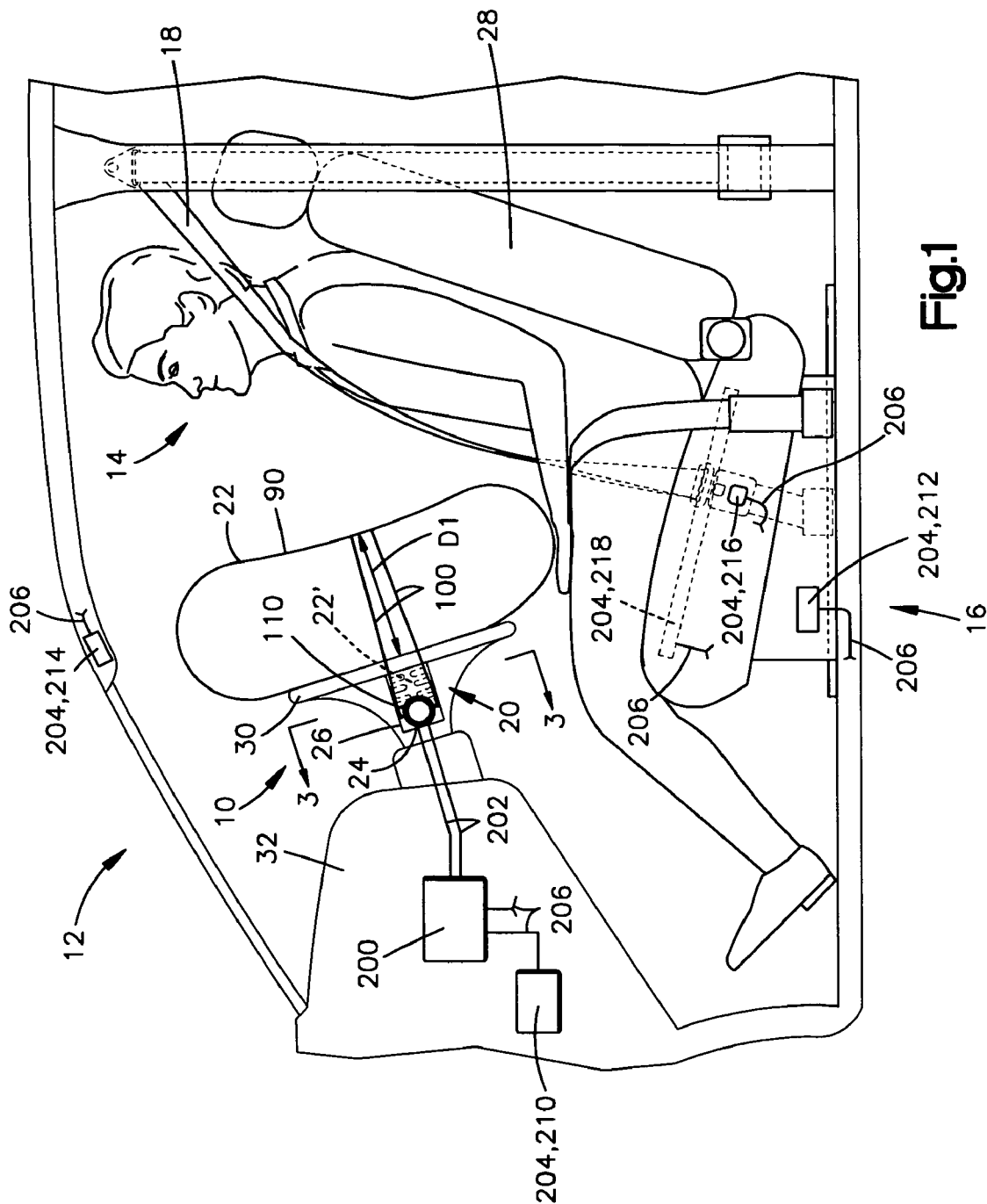
FIG. 1 is a schematic view of a portion of a vehicle including an apparatus for helping to protect an occupant of the vehicle illustrating the apparatus in a first condition, according to the present invention.

The present invention relates to an apparatus 10 for helping to protect an occupant 14 of a vehicle 12. Referring to FIG. 1, the vehicle occupant protection apparatus 10 comprises an air bag module 20. The air bag module 20 of FIG. 1 is a driver front air bag module configured to be mounted in a steering wheel 30 on a driver side 16 of the vehicle 12. Alternatively, the air bag module 20 could be a passenger front air bag module configured to be mounted in an instrument panel 32 on a passenger side (not shown) of the vehicle. The vehicle 12 also includes a seatbelt 18 for helping to restrain the occupant 14 in a vehicle seat 28.

The air bag module 20 includes an air bag 22, an inflation fluid source 24, such as an inflator, and a structure 26, such as a housing, for supporting the air bag 22 and inflator 24 in the vehicle 12. The air bag has a stored condition, indicated generally in dashed lines at 22', in which the air bag is deflated, folded, and stored in the housing 26. The inflator 24 is actuatable to inflate the air bag from the stored condition to a deployed condition illustrated generally in solid lines at 22. In the deployed condition, the air bag 22 is positioned between the occupant 14 and the steering wheel 30 and between the occupant and the instrument panel 32 on the driver side 16 of the vehicle 12.

Figure 3:
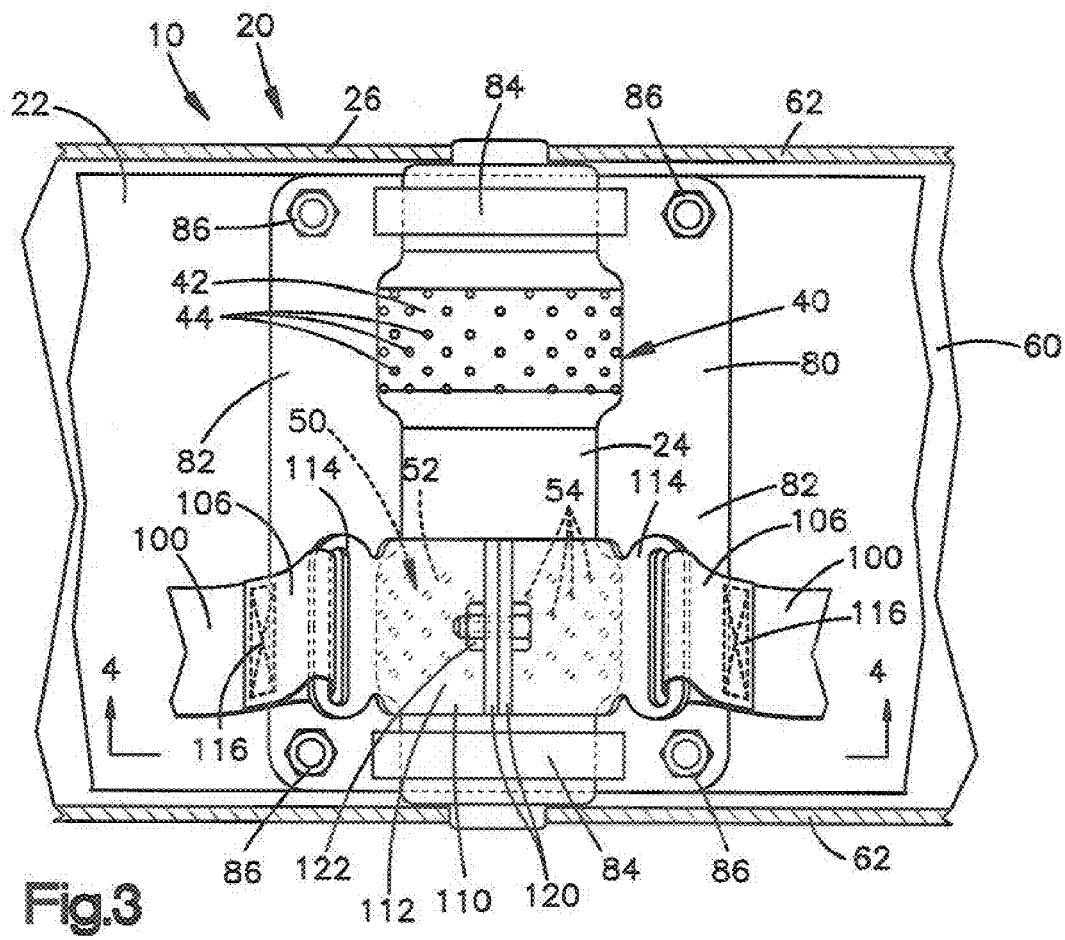
FIG. 3 is an enlarged sectional view taken generally along line 3-3 in FIG. 1 with certain parts omitted for clarity.

Referring to FIG. 3, the inflator 24 is a two-stage inflator in which first and second stages 40 and 50, respectively, are actuatable independently to provide inflation fluid for inflating the air bag 22. In the embodiment of FIG. 3, the inflator 24 has a generally elongated cylindrical configuration in which the first and second stages 40 and 50 occupy different cylindrical portions spaced along the length of the inflator. The inflator 24 could, however, have any desired shape or configuration suited to perform the functions described herein.

The first stage 40 includes a diffuser portion 42 including a plurality of discharge outlets 44 through which inflation fluid is directed into the air bag 22 upon actuation of the first stage. Similarly, the second stage 50 includes a diffuser portion 52 including a plurality of discharge outlets 54 through which inflation fluid is directed into the air bag 22 upon actuation of the second stage.

The inflator 24 may be of any type or configuration suited to provide inflation fluid to the air bag 22. For example, the inflator 24 may be a pyrotechnic inflator that uses the combustion of gas-generating material to generate inflation fluid. As another example, the inflator 24 may contain a stored quantity of pressurized inflation fluid (not shown) in the form of a gas for inflating the air bag 22. As another example, the inflator 24 could contain a combination of pressurized inflation fluid and ignitable material for heating the inflation fluid. As a further example, the inflator 24 could be of any suitable type or construction for supplying a medium for providing inflation fluid for inflating the air bag 22.

Referring to FIG. 5, the housing 26 has a main wall portion 60 and side walls 62 that help define a chamber 64 in which the air bag 22 and inflator 24 are stored. The housing 26 also includes a down-turned retainer portion 70 that forms a retainer channel 72 of the housing. The retainer portion 70 helps define a deployment opening 74 of the housing 26.

Figure 4:
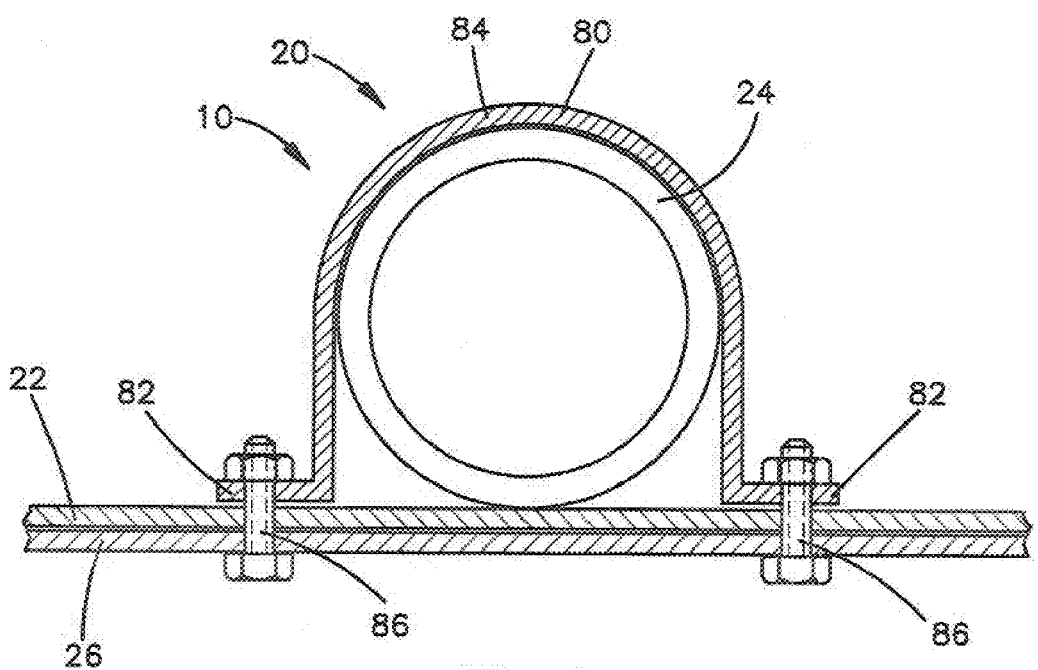
FIG. 4 is a sectional view taken generally along line 4-4 in FIG. 3.

Referring to FIGS. 3 and 4, the air bag 22 and inflator 24 are secured to the housing 26 by a retainer 80. The retainer 80 includes longitudinally extending base portions 82 positioned on opposite sides of the inflator 24 and strap portions 84 that extend between the base portions. As shown in FIG. 4, the strap portions 84 are configured to extend about and mate with opposite end portions of the inflator 24. The retainer 80 is secured to the housing 26 by means 86, such as threaded fasteners, that extend through the base portions 82, the air bag 22, and the main wall portion 60 of the housing. The air bag 22 and inflator 24 are thus clamped between the retainer 80 and the main wall portion 60 of the housing 26.

Referring to FIG. 5, the air bag 22 includes an outer portion or panel 90 that is presented toward the vehicle occupant 14 (see FIGS. 1 and 2) when the air bag is inflated. In the stored condition, the air bag 22 is folded and the outer panel 90 is positioned in the housing 26. During inflation of the air bag 22, the outer panel 90 moves away from the housing 26 as described below.

The apparatus 10 also includes two tethers 100 for helping to control the configuration of the air bag 22 when inflated. The apparatus 10 could include any desired number of tethers 100, such as a single tether or more than two tethers. The tethers 100 help control the configuration of the inflated air bag 22 by limiting or otherwise controlling movement of the outer panel 90 away from the housing 26 upon inflation and deployment of the air bag 22. Each tether 100 has a first end portion 102 secured to the outer panel 90 of the air bag 22 by known means 104, such as stitching, ultrasonic welding, heat bonding, or adhesives.

Each tether 100 also has an opposite second end portion 106 secured to the air bag module 20. According to the present invention, the apparatus 10 includes a tether anchor 110 that facilitates securing the second ends 106 of the tethers 100 to the air bag module 20. Referring to FIGS. 3 and 5, the tether anchor 110 includes a main body portion 112 that has a generally cylindrical configuration. The tether anchor 110 also includes first and second anchor loops 114 that extend from the main body portion 112 in a radially opposing manner.

The cylindrical main body portion 112 is constructed and arranged to mate with an outer surface 56 of the second stage 50 of the inflator 24. As shown in FIG. 5, the main body portion 112 extends or wraps around the outer surface 56. Flange portions 120 extend transversely from opposite ends of the main body portion 112 and are secured by means 122, such as a threaded fastener. The means 122, when fastened, causes the main body portion 112 to clamp onto the second stage 50 of the inflator 24. In this condition, the main body portion 112 at least partially blocks inflation fluid flow through the discharge outlets 54.

Referring to FIGS. 3 and 5, when the air bag module 20 is in the assembled condition, the second end portions 106 of the tethers 100 are secured to the anchor loops 114. In the illustrated embodiments, the second end portion 106 of each tether 100 is placed through an associated one of the anchor loops 114 and folded over so as to have portions that overlie each other. The overlying portions of each second end portion 106 are interconnected by means 116, such as stitching, thus securing the tethers to the tether anchor 110, to the inflator 26, and to the air bag module 20.

Figure 2:
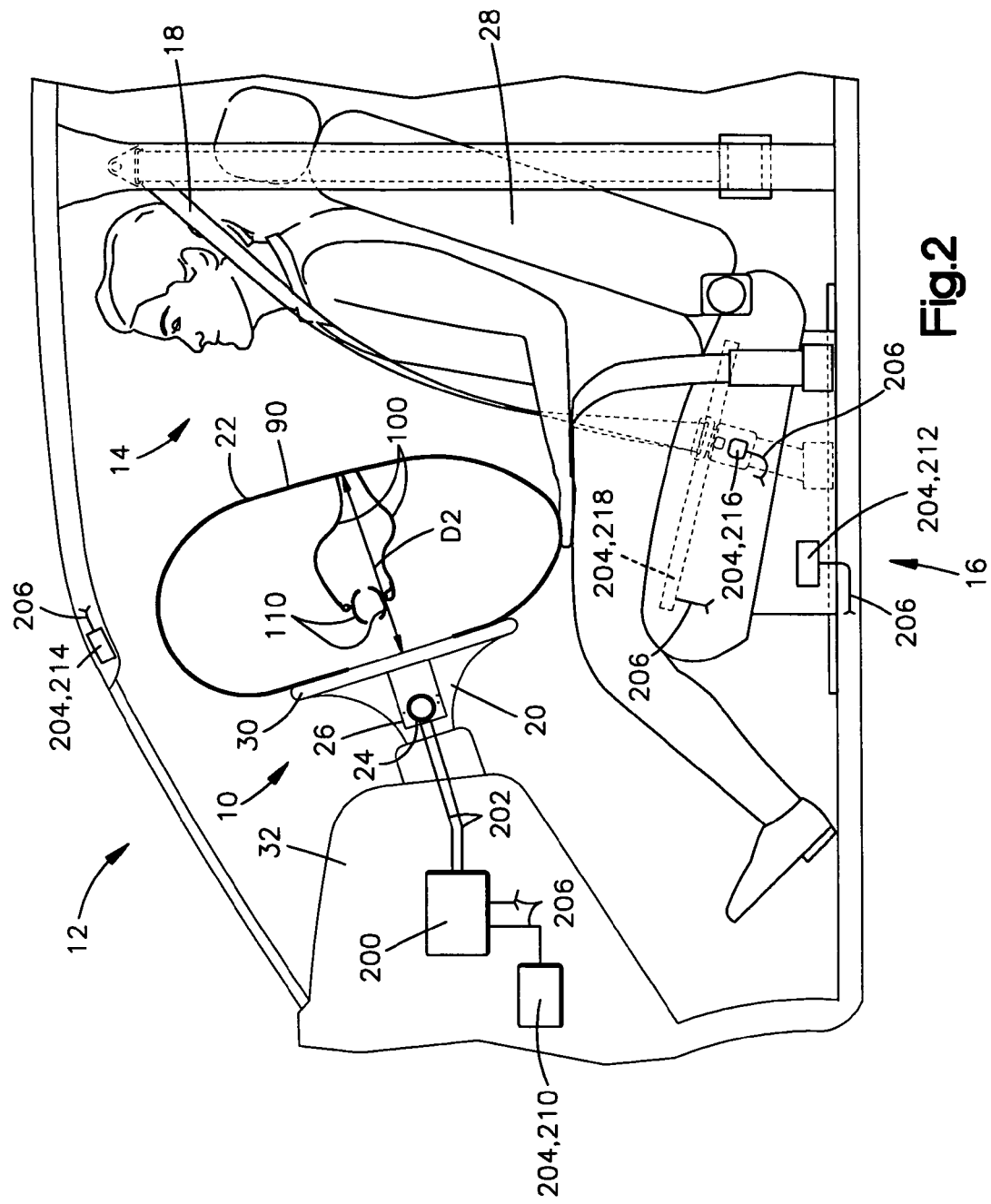
FIG. 2 is a schematic view illustrating the apparatus of FIG. 1 in a second condition.

Referring to FIGS. 1 and 2, the apparatus 10 also includes a controller 200 operatively connected to the inflator 24 by means 202, such as lead wires. The apparatus 10 also includes one or more sensors 204 operatively connected to the controller 200 by means 206, such as lead wires. The sensors 204 are operative to sense one or more conditions of the vehicle 12 or occupant 14 and to provide, via the lead wires 206, signals to the controller 200 indicative of the sensed conditions. The controller 200 is operative to control actuation of the first and second stages 40 and 50 of the inflator 24 in response to the signals provided by the sensors 204.

The sensors 204 include a crash sensor 210, such as an accelerometer, for sensing the occurrence of an event for which inflation of the air bag 22 may be desired, such as a vehicle collision or rollover. The sensors 204 may also include any one of the following: a seat position sensor 212, an occupant position sensor 214, a seatbelt usage sensor 216, and a seat weight sensor 218.

Each of the sensors 204 is of a known construction. For example, the seat position sensor 212 may be a limit switch or a magnetic sensor, e.g., Hall effect device. As another example, the occupant position sensor 214 may be an ultrasonic sensor or a vision system for determining the position of the occupant 14 relative to the instrument panel 32. As another example, the seatbelt usage sensor 216 may be a Hall effect device for sensing whether a buckle of the seatbelt 18 is latched. As a further example, the seat weight sensor 218 may comprise a strain gauge sensor.

The controller 200 executes an algorithm for determining whether to actuate the first and second stages 40 and 50 of the inflator 24 based on signals received from one or more of the sensors 204. According to the algorithm, when the controller 200 receives a signal from the crash sensor 210 indicating the occurrence of an event for which inflation of the air bag 22 is desired, the controller chooses between one of two inflated and deployed conditions for the air bag module 20 based on conditions sensed by one or more of the sensors 204. The first inflated and deployed condition of the air bag module 20 is illustrated in solid lines in FIG. 1. The second inflated and deployed condition of the air bag module 20 is illustrated in FIG. 2.

In the first inflated and deployed condition, the controller 200 actuates the first stage 40 of the inflator 24 only. The first stage 40, when actuated, provides inflation fluid to the air bag 22, which causes the air bag to inflate and deploy to the condition shown in FIG. 1. As shown in FIG. 1, when the air bag 22 is in the first inflated condition, the tethers 100 become tensioned, thus limiting the distance, indicated generally at "D1", that the outer panel 90 is permitted to move away from the housing 26. The tethers 100 are thus effective to help control the inflated configuration of the air bag 22 by limiting the inflated thickness or depth of the air bag. In doing so, the tethers 100 also help control the inflated shape and volume of the air bag 22. The first stage 40 may thus be sized so as to provide desired performance characteristics, such as deployment time and inflated pressure, when inflating the air bag 22 to the first condition.

In the second inflated condition, the controller 200 actuates both the first stage 40 and the second stage 50 of the inflator 24. The first and second stages 40 and 50, when actuated, provide inflation fluid to the air bag 22, causing the air bag to inflate and deploy to the condition shown in FIG. 2. As shown in FIG. 2, when the air bag 22 is in the second inflated condition, the tethers 100 are released, thus permitting the outer panel 90 move away from the housing 26 a distance, indicated generally at "D2", that is greater than the distance D1 (see FIG. 1) of the first inflated condition. The first and second stages 40 and 50 of the inflator 24 are sized so as to provide desired performance characteristics, such as deployment time and inflated pressure, for the increased depth and volume of the air bag 22 in the second inflated and deployed condition.

In the embodiment illustrated in FIGS. 1-5, the tethers 100, when in the non-released condition of FIG. 1, help limit or otherwise control the inflated thickness, depth, shape, or volume of the air bag 22. When in the released condition of FIG. 2, the tethers 100 do not help limit or otherwise control the inflated thickness, depth, shape, or volume of the air bag 22. Those skilled in the art, however, will appreciate that the tethers 100 could be configured to help limit or otherwise control the air bag 22 to an inflated thickness, depth, shape, or volume in both the released and non-released conditions.

For example, as shown schematically in FIG. 6, the second end portions 106 of the tethers 100 could be anchored to a support structure, such as the housing 26, and a middle portion could be secured to the tether anchor 110. In this instance, when the first stage 40 only is actuated, the middle portions of the tethers 100 remain secured to the fixed anchor 110 such that the portions of the tethers 100 that extend between the anchor 110 and the air bag 22 would become tensioned and thus help limit or otherwise control the inflated thickness, depth, shape, or volume of the air bag 22. When the first stage 40 and second stage 50 are actuated, the anchor 110 fails and relieves tension on the middle portions of the tethers 100 such that the entire length of the tethers 100, i.e., from the first end 102 to the second end 106, would become tensioned and thus help limit or otherwise control the inflated thickness, depth, shape, or volume of the air bag 22. Thus, the effective length of the tethers 100 is selected based upon whether the second stage 50 is actuated.

The algorithm executed by the controller 200 may determine whether to actuate the first stage 40 alone or in combination with the second stage 50. For example, the controller 200 may actuate only the first 40 stage if the seat position sensor 212 indicates that the vehicle seat 28 is at or forward of a predetermined forward position of the seat. In this example, the controller 200 may actuate both the first and second stages 40 and 50 if the seat position sensor 212 indicates that the vehicle seat 28 is rearward of the predetermined forward position of the seat.

As another example, the controller 200 may actuate only the first 40 stage if the occupant position sensor 214 indicates that the occupant 14 is located at or forward of a predetermined forward position. In this example, the controller 200 may actuate both the first and second stages 40 and 50 if the occupant position sensor 214 indicates that the occupant 14 is located rearward of the predetermined forward position. As a further example, the controller 200 may actuate the second stage 50 based on a latched or unlatched condition of the seat belt 18 indicated by the sensor 216 or based on the load on the vehicle seat 28 indicated by the sensor 218.

According to the present invention, the air bag module 20 is configured to release the tethers 100 by rupturing, breaking, or otherwise causing a structural failure in the tether anchor 110. Referring to FIG. 5, when the second stage 50 of the inflator 24 is actuated, inflation fluid acts on the main body portion 112 of the tether anchor 110 via the discharge outlets 54. As the second stage 50 produces inflation fluid, fluid pressure acting on the main body portion 112 causes stresses that increase to a point where structural failure occurs. As shown in FIGS. 5 and 6, the main body portion 112 may include stress risers 118, such as notches or other areas of reduced wall thickness, that promote structural failure of the tether anchor 110 upon actuation of the second stage 50.

From the above description of the invention, those skilled in the art will perceive improvements, changes, and modifications. Such improvements, changes, and modifications within the skill of the art are intended to be covered by the appended claims.

Having described the invention, the following is claimed:

1. An apparatus for helping to protect an occupant of a vehicle, the apparatus comprising:
a housing;
an air bag supported by the housing;
an inflator supported by the housing, the inflator comprising a first stage including at least one first outlet passage and a second stage comprising at least one second outlet passage, the first and second outlet passages being provided for discharging inflation fluid into the air bag;
an anchor secured to the inflator and at least partially blocking inflation fluid flow through the at least one second outlet passage, the anchor being configured to disconnect from the inflator in response to inflation fluid discharged through the second outlet passage when the second stage is actuated; and
at least one tether having a first end connected to the air bag and a second end secured to the anchor.

2. The apparatus recited in claim 1, wherein the first and second stages are independently actuatable, the at least one tether helping to limit movement of the air bag away from the housing upon actuation of the first stage only, the tether being released and thereby not restraining movement of the air bag away from the housing upon actuation of the second stage.

3. The apparatus recited in claim 1, wherein the tether limits movement of an outer panel of the air bag away from the housing to a first distance when the air bag is inflated and the anchor is connected to the inflator.

4. The apparatus recited in claim 3, wherein the anchor is configured to disconnect from the inflator upon actuation of the second stage, thus releasing the outer panel for movement away from the housing a second distance greater than the first distance.

5. The apparatus recited in claim 1, wherein the second stage of the inflator has a generally cylindrical configuration, the anchor comprising a generally cylindrical main portion that extends around the second stage of the inflator and at least partially blocks the at least one second outlet passage.

6. The apparatus recited in claim 5, wherein the main portion undergoes a structural failure in response to pressure generated by inflation fluid flow from the second stage, the anchor disconnecting from the inflator when the main portion undergoes the structural failure.

7. The apparatus recited in claim 1, wherein the anchor undergoes a structural failure in response to pressure generated by inflation fluid flow through the second outlet passages, the anchor disconnecting from the inflator when the portion undergoes the structural failure.

8. The apparatus recited in claim 7, wherein the portion that undergoes a structural failure comprises at least one stress riser that promotes structural failure.

9. The apparatus recited in claim 1, wherein the second stage is selectively actuatable in response to sensed conditions in the vehicle.

10. The apparatus recited in claim 9, wherein the sensed conditions comprise at least one of a vehicle seat position, an occupant position, a seatbelt latch condition, and a sensed weight on a vehicle seat.

11. An apparatus for helping to protect an occupant of a vehicle, the apparatus comprising:
a housing;
an air bag supported by the housing;
an inflator supported by the housing, the inflator comprising a first stage including at least one first outlet passage and a second stage comprising at least one second outlet passage, the at least one first outlet passage and the at least one second outlet passage being provided for discharging inflation fluid into the air bag;

an anchor secured to the inflator and at least partially blocking inflation fluid flow through the at least one second outlet passage, the anchor being configured to undergo a structural failure in response to inflation fluid discharged through the at least one second outlet passage when the second stage is actuated; and at least one tether having a first end connected to the air bag and a second end secured to the anchor.

* * * * *

UNITED STATES PATENT AND TRADEMARK OFFICE
CERTIFICATE OF CORRECTION

| | |
|---|---|
| PATENT NO. | : 7,618,061 B2 |
| APPLICATION NO. | : 11/410554 |
| DATED | : November 17, 2009 |
| INVENTOR(S) | : Eric J. Eckelberg |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 761 days.

Signed and Sealed this

Nineteenth Day of October, 2010

David J. Kappos
*Director of the United States Patent and Trademark Office*